United States Patent [19]
Phillips et al.

[11] 3,895,573
[45] July 22, 1975

[54] CYLINDRICAL BALE FORMING SYSTEM

[75] Inventors: Carmen S. Phillips; Albert G. Blanton; Fenton L. Kenna, Jr., all of Memphis, Tenn.

[73] Assignee: International Harvester Company, Chicago, Ill.

[22] Filed: Sept. 16, 1974

[21] Appl. No.: 506,480

[52] U.S. Cl. .................................. 100/88; 56/341
[51] Int. Cl.[2]... A01D 39/00; B30B 5/06; B30B 9/00
[58] Field of Search ............... 100/5, 13, 88, 89, 40; 56/341, 342, 343, 1 M

[56] References Cited
UNITED STATES PATENTS

| | | | |
|---|---|---|---|
| 703,470 | 7/1902 | Rembert | 100/88 X |
| 2,096,990 | 10/1937 | Luebben | 100/88 |
| 2,581,542 | 1/1952 | Kolzing | 56/343 |
| 3,837,159 | 9/1974 | Vermeer | 100/88 |
| 3,848,526 | 11/1974 | Mast | 100/88 |

*Primary Examiner*—Peter Feldman
*Attorney, Agent, or Firm*—Neal C. Johnson; Floyd B. Harman

[57] ABSTRACT

A baler adapted to be pulled along the ground to pick up a windrow of hay and roll the hay into a cylindrical bale of substantial size and weight. The hay is fed under a feed roller onto an endless lower belt having a rearwardly movable bale-supporting run. A plurality of parallel endless belts are trained on a plurality of rollers disposed above the lower belt and define an expansible bale-forming zone with the lower belt. The rollers are journaled on a superstrucure projecting above the lower belt and include a power drive roller for the upper belts, several non-driven belt-support rollers, and a roller mounted on a gate structure pivotable rearwardly during bale formation. The upper belts extend forwardly from the gate-mounted roller to the power drive roller in a slack condition so as to be non-drivable thereby during initial receipt of hay into the bale-forming zone. A belt tightener assembly is pivotally mounted on the superstructure and includes rollers engageable with the upper belts for tightening the belts into drivable relation with the drive roller as hay accumulates in the bale-forming zone.

5 Claims, 8 Drawing Figures

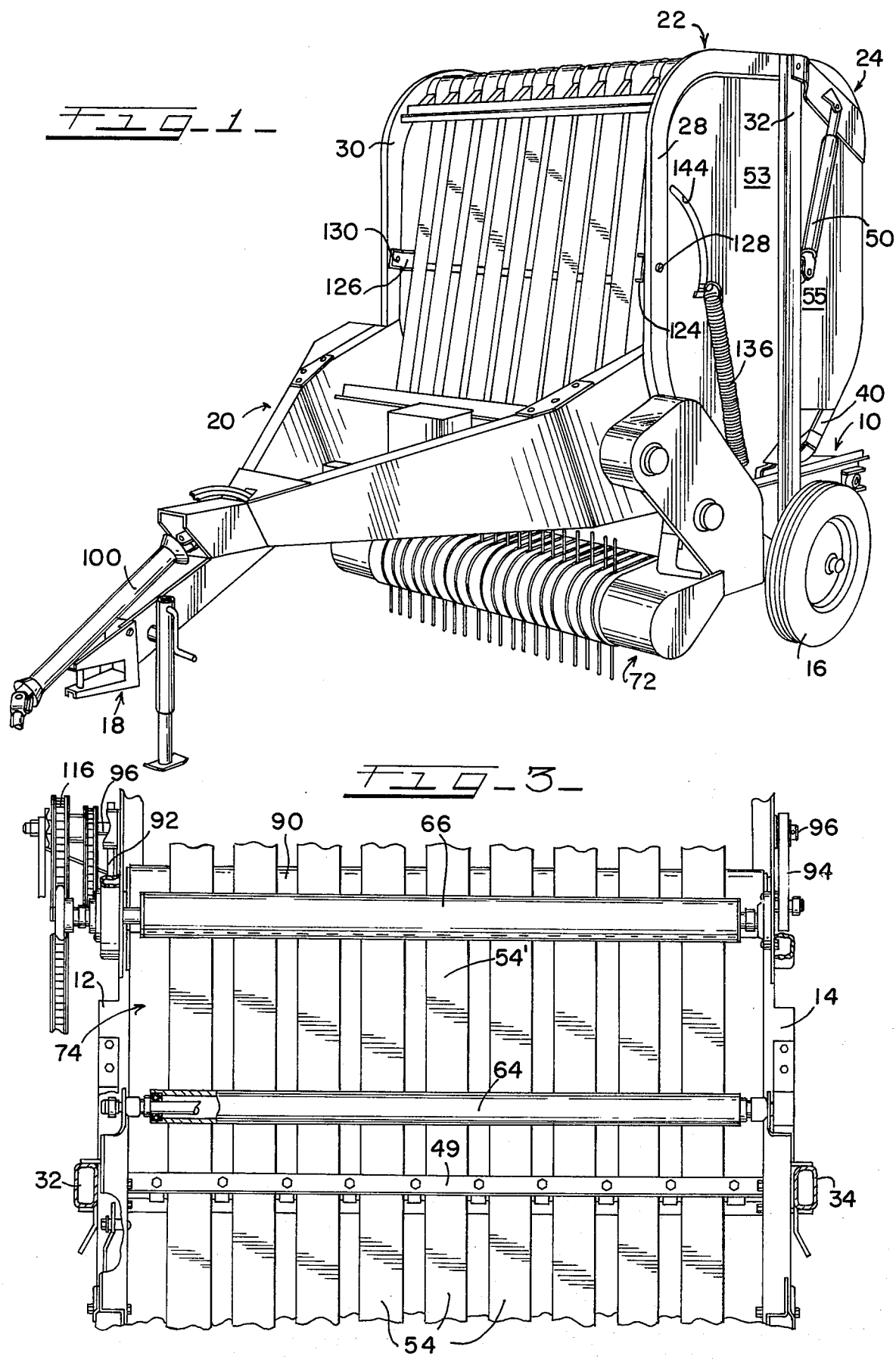

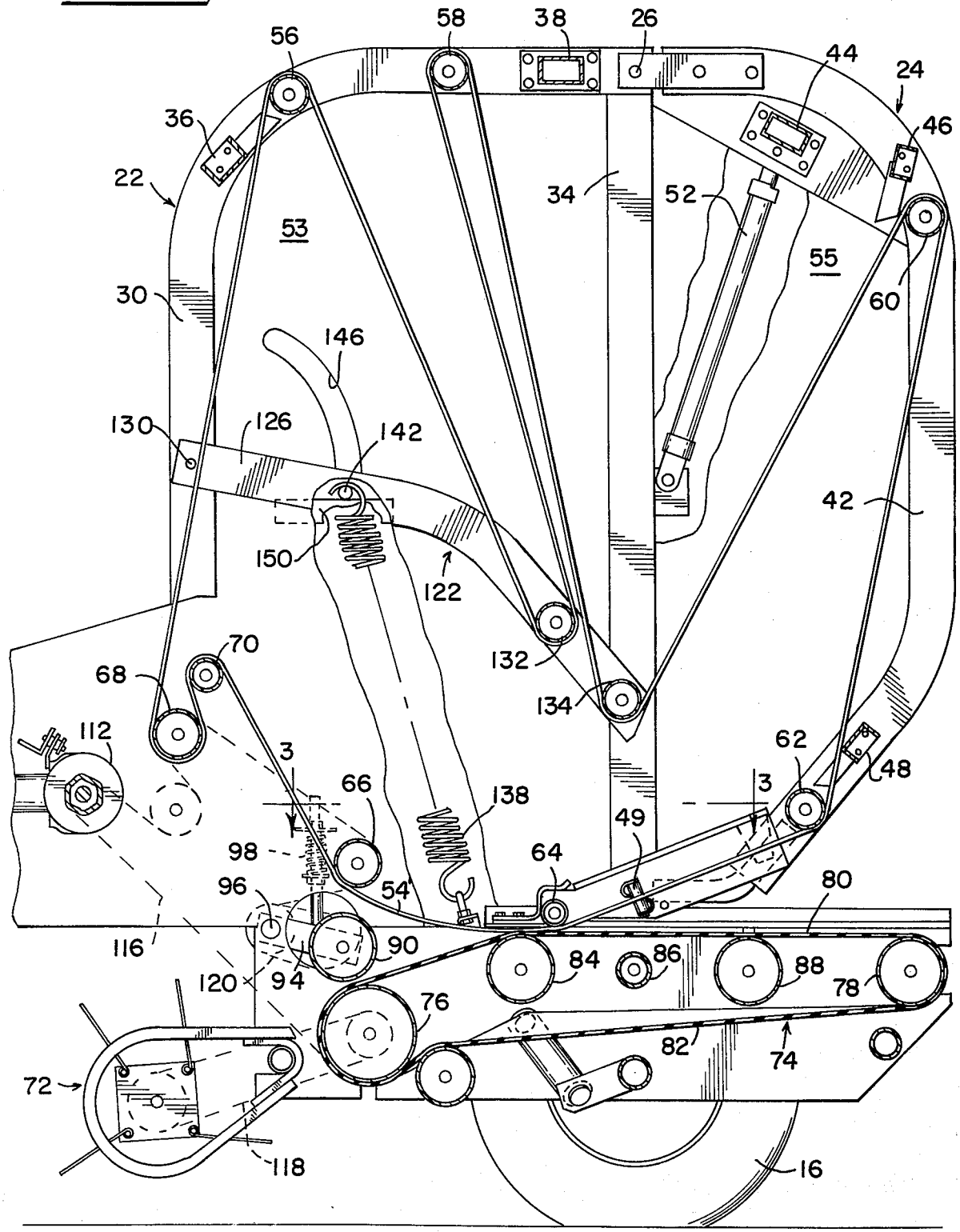

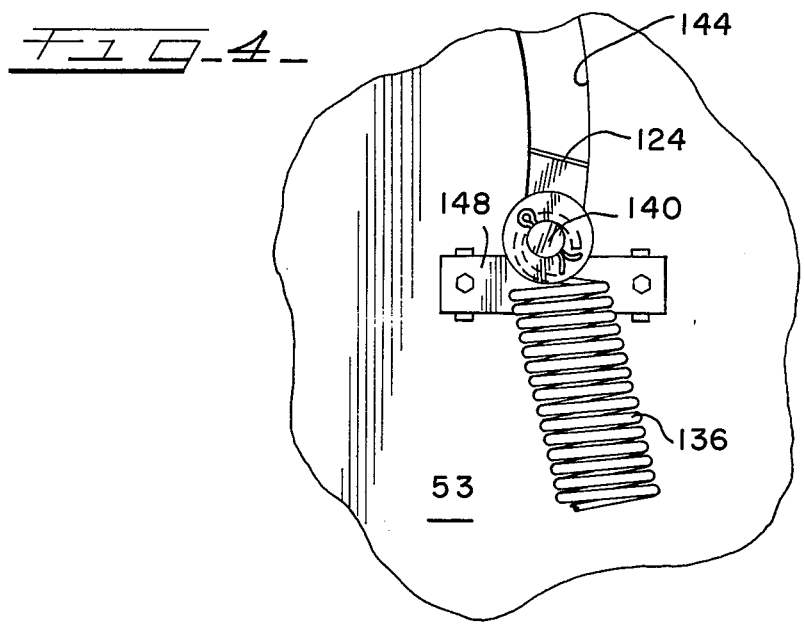
FIG-4-
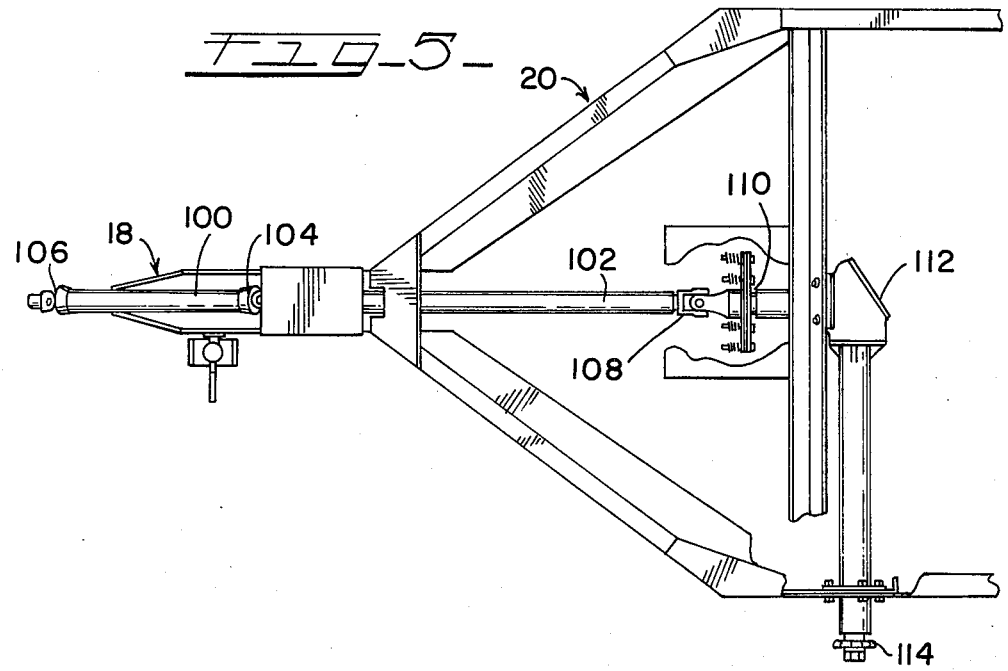
FIG-5-

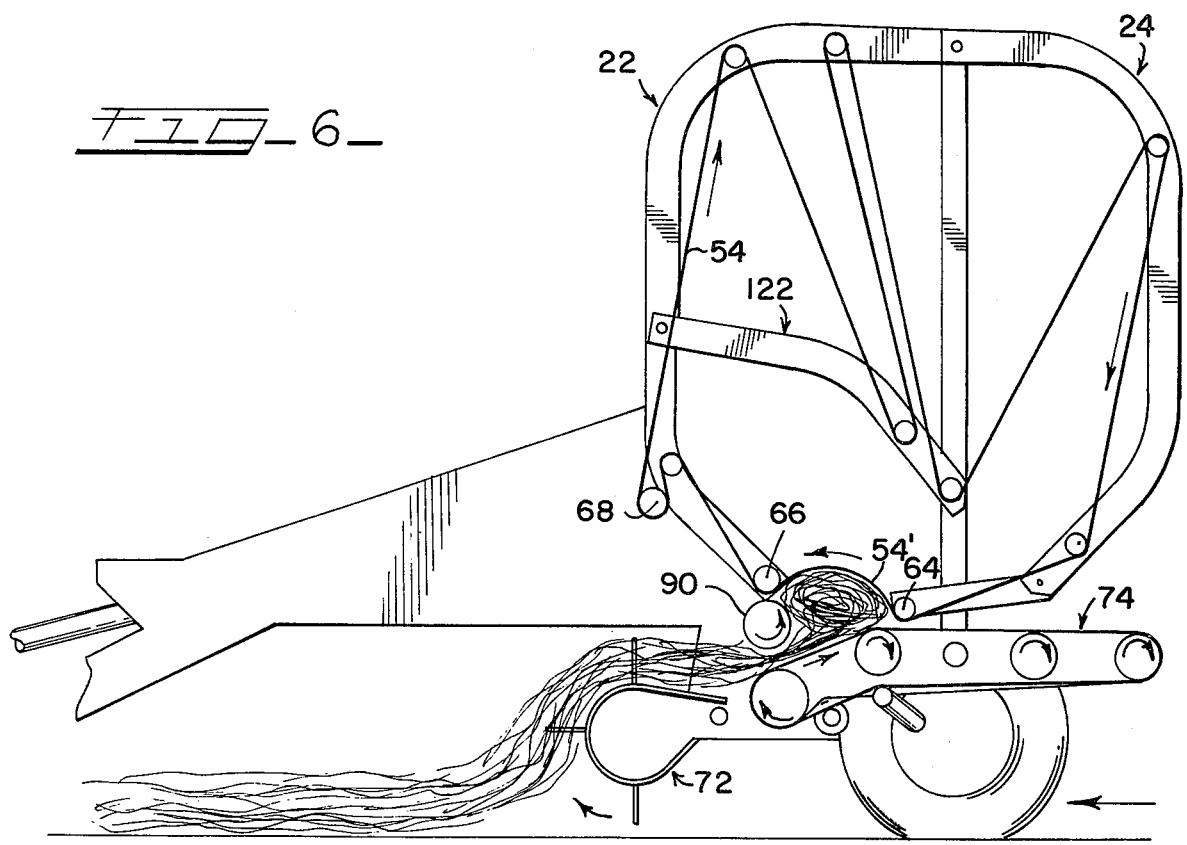
FIG_6_
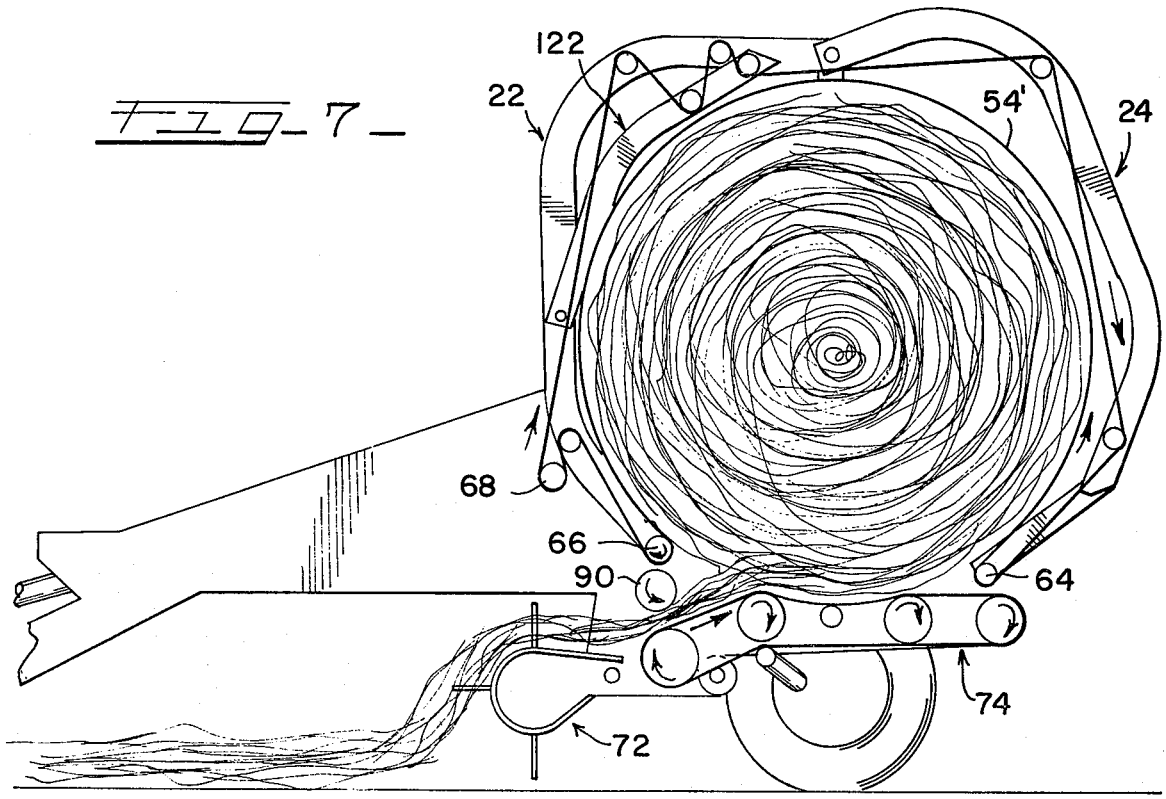
FIG_7_

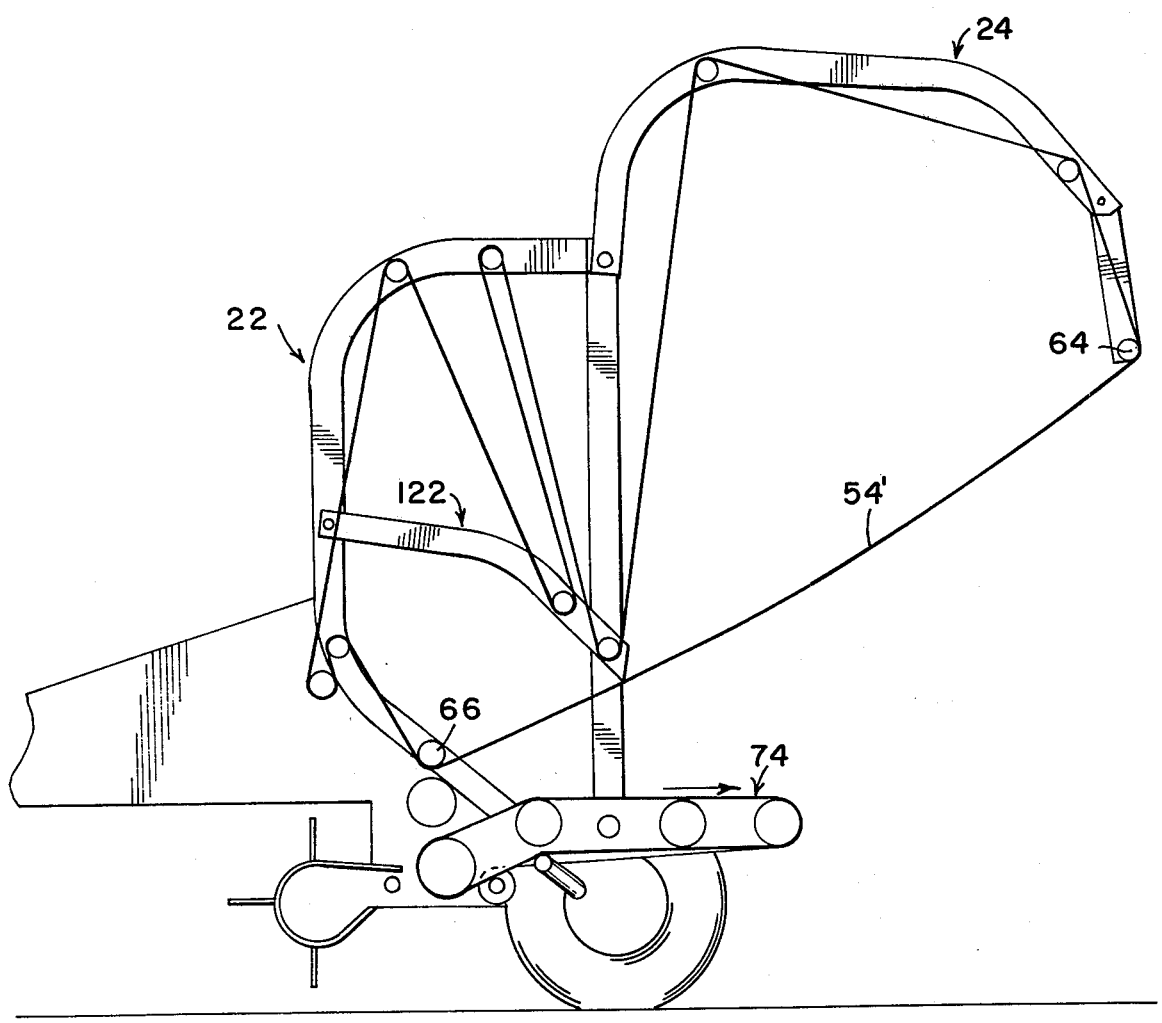

CYLINDRICAL BALE FORMING SYSTEM

BACKGROUND OF THE INVENTION

1. Field of the Invention:

The invention relates generally to balers for forming cylindrical bales and, more particularly, to an improved bale starting system.

2. Prior Art:

U.S. Pat. No. 3,722,197 shows a baler for cylindrical bales formed between a lower belt 21 and a plurality of upper belts 51. The belts 51 are constantly held in a taut condition by a tightener assembly 56 and thus are constantly driven by the various driving rollers 41, 44, and 45. As shown in FIG. 3 hay is fed onto the belt 21 beneath a roller 73. The belts 51 are driven oppositely to the lower belt 21 and run from the roller 46 forwardly to the roller 41. A "gate" assembly 78 is suspended from the belt tightener assembly 56 for the purpose of preventing escape of hay from the bale zone during initial bale formation under the propelling influence of the constantly running belts 51. As shown in FIGS. 2 and 3 the assembly 78 includes a plurality of spaced fingers 84 which project downwardly to close the space between the rollers 41 and 73 to prevent escape of hay forwardly between those rollers. As the bale increases in size the assembly 78 is moved upwardly out of the baling zone by the upwardly moving tightener assembly 56 and serves no further function in the bale forming operation.

SUMMARY

The invention provides an improved bale starting system wherein means are provided for maintaining bale-forming belts in a slack, non-drivable relation with the power drive rollers therefor during initial bale formation, while maintaining the belts in condition or position to be driven in response to continuing receipt of hay or other fibrous material in the bale-forming zone. The system includes a belt tightener assembly and a stop structure operable therewith for permitting the belts to be retained loosely on the drive rollers as bale formation begins. With the upper belts thus in a stationary condition the initial hay received in the bale-forming zone will not be moved forwardly by the belts. Consequently, the hay is not projected forwardly out of the zone. The ultimate result from the standpoint of machine design is that the bale starting assembly 78 of the above mentioned patent is no longer required and can be totally eliminated.

Perhaps the gist of the present invention is in the realization that the escape of hay was not so much a function of a gap to be closed in the baling zone, but rather a function of controlling the driven movement of the bale-forming belts.

A further advantage associated with the initially slack belts is that the center or core of the complete bale is somewhat less dense than the remainder of the bale. Unlike bales formed the conventional way, the bales with the loose core are better able to resist spoilage.

The overall object of the invention is to provide a baler with an improved bale-starting system which eliminates assemblies thought to be required, and results in a simplified and less costly means to insure that hay will not escape from the bale-forming zone, particularly during the initial bale-forming process.

BRIEF DESCRIPTION OF THE DRAWINGS

FIG. 1 is a perspective view of a hay baler incorporating the improved bale starting system of the invention;

FIG. 2 is an enlarged fragmentary sectional side elevation taken generally along the longitudinal centerline of the baler of FIG. 1;

FIG. 3 is a fragmentary sectional view in plan of the initial bale-forming zone taken generally along the lines 3-3 of FIG. 2;

FIG. 4 is an enlarged fragmentary elevation of a portion of the bale tension stop structure of the invention;

FIG. 5 is a fragmentary plan view of the hitch and frame structure of the baler supporting the basic elements of the power drive line system;

FIG. 6 is a schematic elevation of the baler during initial bale formation;

FIG. 7 is a schematic view of the baler showing a completed bale therein; and

FIG. 8 is a schematic of the baler after the bale has been completed and conveyed therefrom.

DESCRIPTION OF THE PREFERRED EMBODIMENT

Referring first to FIG. 1 there is shown a baler having a rigid frame 10 including a pair of transversely spaced side frame members 12 and 14 (FIG. 3) extending parallel to the centerline of the frame. The frame 10 is supported on wheels 16 for towing behind a tractor (not shown) coupled to a hitch 18 on the front of a forwardly converging tongue structure 20 secured rigidly to the frame.

Projecting above the side frame members 12 and 14 is a superstructure comprising a fixed framework 22 and a gate structure 24 mounted on the framework 22 for pivotal movement about a pivot connection 26. The framework 22 includes a pair of generally C-shaped frame members 28 and 30 projecting upwardly from the side frame members 12 and 14 respectively. Vertical frame members 32 and 34 are secured to the side frame members 12 and 14 respectively and extend straight upwardly into rigid connection with the members 28 and 30. Suitable cross-bracing for the framework 22 is shown at 36 and 38 connected between the members 28 and 30.

The pivotable gate structure 24 includes a pair of generally C-shaped side frame members 40 and 42 interconnected rigidly by suitable cross-bracing shown at 44, 46, 48 and 49 in FIG. 2. Hydraulic piston-cylinder units 50 and 52 are connected between the fixed framework 22 and the gate 24 on opposite sides of the baler for raising and lowering the gate about the pivot connection 26. In practice the sides of the framework 22 and gate 24 are closed by respective pairs of side sheets 53 and 55.

A plurality of endless bale-forming belts 54 is disposed in spaced parallel relation across the width of the framework 22 and gate 24. The belts 54 are trained on support rollers 56 and 58 on the framework 22, support rollers 60, 62, and 64 on the gate 24, and drive rollers 66 and 68 and an idler roller 70 on the framework 22. The extent of the belts 54 between the gate-mounted roller 64 and the framework-mounted drive roller 66 is designated 54' and constitutes an upwardly expansible upper parameter of a bale-forming zone.

The baler includes a hay pickup unit 72 of conventional construction pivotally connected to the forward end of the baler frame 10 for picking up windrowed hay from the ground and feeding it rearwardly.

Disposed rearwardly of the pickup unit 72 is an endless belt 74 trained on a forward drive roller 76 and a rearward tightener roller 78, both journalled on the side frame members 12 and 14. The belt 74 extends between the roller 76 and 78 in an upper bale-supporting run 80 and a lower return run 82. A series of support rollers 84, 86, and 88 are journalled on the frame 10 beneath the upper run 80 to support the same as a bale is formed thereon. The tightener roller 78 is biased by spring assemblies (not shown) toward the rear of the baler to keep the belt 74 taut.

A power-driven press roller 90 is disposed transversely of the baler within the vertical space between the upper belt drive roller 66 and the lower belt drive roller 76 for assisting in feeding hay rearwardly from the pickup unit 72 onto the lower belt 74. The press roller 90 is journalled on a pair of arms 92 and 94 (FIG. 3) mounted for pivotable movement about a pivot connection 96. Coil springs 98, 98 (one of which being shown in FIG. 2) are operative between the baler framework and the arms 92 and 94 for biasing the press roller 90 downwardly to exert a compacting force onto the hay being fed onto the lower belt 74. It will be seen with reference to FIG. 2 that the above-mentioned bale-forming zone is defined at the bottom by the upper run 80, at the rear by the gate-mounted roller 64, at the top by the belt reach 54', and at the front by the drive roller 66 and the press roller 90.

The various above described bale-forming components are power driven from the PTO of the towing tractor. As shown generally in FIG. 5 the power drive line includes shafts 100 and 102 interconnected by a universal joint 104, all supported on the draft tongue structure 20. The front-most shaft 100 is connectable to the tractor PTO shaft through a universal joint 106. The shaft 102 is connected through another universal joint 108 to a slip clutch 110. Power is fed through a right angle gearbox 112 to an output sprocket 114.

Drive is transferred from the output sprocket 114 to the drive rollers 66 and 68 of the belts 54 and the drive roller 76 of the belt 74 through an endless chain shown in dotted lines at 116 in FIG. 2 (and shown partially in solid lines in FIG. 3). The pickup 72 and press roller 90 are driven by respective drive chains shown in dotted lines at 118 and 120 in FIG. 2.

In accordance with a feature of the invention the upper belts 54 are retained in a slack condition so as to be non-drivable by the drive rollers 66 and 68 prior to and during initial receipt of hay into the baleforming zone. Concurrently, the belts 54 are retained in a condition wherein the belts become taut to compressively encompass a portion of the periphery of the bale as it is formed. A belt tightener assembly is designated generally at 122 in FIG. 2 and includes a pair of rigidly interconnected arms 124 and 126 pivotally mounted at coaxial connections 128 and 130 on the frame members 28 and 30. A pair of belt tightening rollers 132 and 134 is journalled on the arms 124 and 126 in engagement with the belts 54 as shown in FIG. 2. Elongated coil springs 136 and 138 are connected in tension between the arms 124 and 126 respectively, and the baler frame 10 for urging the assembly downwardly about the pivot connections 128 and 130.

The springs 136 and 138 are secured to the respective arms 124 and 126 by engagement with pins 140 and 142 projecting outwardly from the arms 124 and 126 respectively. The pins project through arcuate slots 144 and 146 defined through the opposite side sheets 53, 53 to accommodate arcuate movement of the assembly 122. Stop plates 148 and 150 are bolted to the side sheets 53, 53 in vertically adjustable position for engagement by the pins 140 and 142 respectively. The stop plates 148 and 150 prevent the assembly 122 from fully tightening the belts 54. The belts are retained with sufficient slackness on the various support rollers to prevent the belts from being driven by the drive rollers 66 and 68 until hay is received within the bale-forming zone in sufficient amounts to effect tightening on the drive rollers.

In operation, power is transmitted through the power drive line of FIG. 5 to the belt 74, press roller 90, and pickup 72. Power is also transmitted to the drive rollers 66 and 68, but the upper belts 54 are not driven thereby since these belts are retained in a slack non-drivable condition by the engagement of the assembly 122 on the stop plates 148 and 150. As shown in FIG. 2 the belt reach 54' between the rollers 64 and 66 hangs slack prior to receipt of hay into the bale-forming zone. Referring to FIG. 6 the pickup 72 lifts the windrowed hay rearwardly onto the belt 74 beneath the press roller 90. As hay accumulates within the zone the reach 54' of the belts 54 is extended and the belts engage the drive rollers 66 and 68 with a tightened grip which drives the belts. Since the belts 54 are not driven during the belt starting period, they cannot propel the hay forwardly out of the zone as in the prior art which required special gap-closing structure.

As the bale increases in diameter to the full size shown schematically in FIG. 7, the belt-tightener assembly 122 swings gradually upwardly and the gate 24 swings rearwardly. The springs 136 and 138 (FIGS. 1 and 2) are operative on the assembly 122 to maintain the belts 54 in compressive engagement with the bale being formed. Upon completion of the bale the hydraulic units 50 and 52 (FIGS. 1 and 2) are actuated to raise the gate 24 to a full open position shown schematically in FIG. 8. The belt 74 then conveys the completed bale rearwardly onto the ground and the assembly 122 pivots downwardly as shown. The gate 24 is then closed and another bale can be started.

By the foregoing applicants have provided an improved bale-forming system designed to accomplish the objects of the invention.

What is claimed is:

1. In a baler adapted to form a cylindrical bale of fibrous material within a bale-forming zone, the combination comprising:
   a frame;
   an endless belt conveyor disposed generally horizontally on the frame and having an upper run movable in a front-to-rear conveying direction and defining the bottom of said bale-forming zone;
   a superstructure on said frame extending above said belt conveyor, said superstructure including a gate pivotally mounted for rearward opening about a transverse pivot axis;
   a roller journaled on an end of said gate and disposed in proximity to said upper run of said belt conveyor and defining therewith a rearmost parameter of said bale-forming zone;

a feed roller journaled on said superstructure above said upper run proximate to the front thereof to guide incoming material onto said belt conveyor;

a power drive roller journaled on said superstructure closely above said feed roller so as to define therewith a forward parameter of said bale-forming zone;

a plurality of bale-forming belts on said superstructure in forwardly running engagement between said gatemounted roller and said drive roller so as to define the top portion of said bale-forming zone;

and means for maintaining said bale-forming belts in slack condition from said gate-mounted roller to said drive roller so as to be non-drivable thereby prior to receiving material into said zone while maintaining said belts in taut relation for driving during subsequent bale formation.

2. The subject matter of claim 1, wherein said means includes a belt tightener assembly pivotally mounted on said superstructure and including a tightener roller engageable with said bale-forming belts, means biasing said assembly to a position wherein said tightener roller engages said belts, and stop means engaged by said assembly to prevent tightening said belts prior to bale formation.

3. In a baler adapted to form a cylindrical bale of fibrous material in a bale-forming zone, the combination comprising:

a frame;

an endless belt conveyor disposed on the frame and having an upper run movable in a front-to-rear conveying direction and defining the bottom of said bale-forming zone;

a superstructure on said frame extending above said belt conveyor, said superstructure including a gate pivotally mounted for rearward opening about a transverse pivot axis;

a roller journaled on an end of said gate and disposed in proximity to said upper run of said belt conveyor and defining therewith a rearmost parameter of said baleforming zone;

a feed roller journaled on said superstructure above said upper run proximate to the front thereof to guide incoming material onto said belt conveyor;

a power drive roller journaled on said superstructure closely above said feed roller so as to define therewith a forward parameter of said bale-forming zone;

a plurality of bale-forming belts on said superstructure in forwardly running engagement between said gate-mounted roller and said drive roller so as to define the top portion of said bale-forming zone;

and means for maintaining said bale-forming belts in non-driven relation with said power drive roller while maintaining said belts in position to be driven by said drive roller in response to receipt of material into said zone, whereby material will not be ejected by said belts from said zone.

4. The subject matter of claim 3, wherein said means includes a tightener roller movably biased toward engagement with said belts, and stop means effective to prevent said tightener roller from disposing said belts into a taut condition prior to bale formation.

5. In a baler adapted to gather hay from the ground and form a cylindrical bale within a bale-forming zone, the combination comprising:

a mobile frame;

an endless belt conveyor disposed on the frame and having an upper run movable in a front-to-rear conveying direction and defining the bottom of said bale-forming zone;

a superstructure on said frame extending above said belt conveyor, said superstructure including a gate pivotally mounted for rearward opening about a transverse pivot axis;

a roller journaled on an end of said gate and disposed in proximity to said upper run of said belt conveyor and defining therewith a rearmost parameter of said baleforming zone;

a feed roller journaled on said superstructure above said upper run proximate to the front thereof to guide incoming hay onto said belt conveyor;

a power drive roller journaled on said superstructure immediately above said feed roller so as to define therewith a forward parameter of said bale-forming zone;

a plurality of support rollers journaled on said superstructure in progressive front-to-rear spaced relation along the top of the superstructure;

a plurality of bale-forming endless belts trained in running sequence on said support rollers downwardly onto said gate-mounted roller forwardly onto said drive roller and upwardly onto said support rollers, the extent of said belts between said gate-mounted roller and said drive roller defining the top of said bale-forming zone;

a belt tightener assembly pivoted on said superstructure and including a tightener roller in engagement with said bale-forming belts at a point in their extent on said support rollers;

stop means on said superstructure engageable by said tightener assembly to prevent tightening of said belts onto said drive roller during initial receipt of the hay into said zone;

and resilient means operable on said tightener assembly for maintaining said belts in firm driving engagement on said drive roller so as to be driven thereby as hay accumulates in said zone.

* * * * *